United States Patent [19]
Okazaki et al.

[11] Patent Number: 5,777,424
[45] Date of Patent: Jul. 7, 1998

[54] VIBRATION ACTUATOR

[75] Inventors: Mitsuhiro Okazaki; Michihiro Tobe, both of Kawasaki, Japan

[73] Assignee: Nikon Corporation, Tokyo, Japan

[21] Appl. No.: 580,973

[22] Filed: Jan. 3, 1996

[30] Foreign Application Priority Data

Jan. 6, 1995 [JP] Japan .................. 7-000804
Dec. 26, 1995 [JP] Japan .................. 7-339640

[51] Int. Cl.$^6$ ..................... H02N 2/00
[52] U.S. Cl. ........................ 310/323
[58] Field of Search ............... 310/323

[56] References Cited

U.S. PATENT DOCUMENTS

| | | | |
|---|---|---|---|
| 3,481,411 | 12/1969 | Wood | 310/323 |
| 3,485,307 | 12/1969 | Riley et al. | 310/323 |
| 3,595,325 | 7/1971 | Libby et al. | 310/323 |
| 3,710,150 | 1/1973 | McMaster | 310/323 |
| 4,165,961 | 8/1979 | Yamamoto et al. | 431/1 |
| 4,965,482 | 10/1990 | Ohnishi et al. | 310/323 |
| 5,051,647 | 9/1991 | Uchikawa et al. | 310/323 |
| 5,115,161 | 5/1992 | Myohga et al. | 310/323 |
| 5,469,011 | 11/1995 | Safabakhsh | 310/323 |
| 5,578,888 | 11/1996 | Safabakhsh | 310/323 |

FOREIGN PATENT DOCUMENTS

| | | | |
|---|---|---|---|
| 876357 | 7/1971 | Canada | 310/323 |
| 0015279 | 1/1991 | Japan | 310/323 |
| 8-103089 | 4/1996 | Japan | 310/323 |
| 8-140377 | 5/1996 | Japan | 310/323 |

*Primary Examiner*—Thomas M. Dougherty
*Attorney, Agent, or Firm*—Shapiro and Shapiro

[57] ABSTRACT

A vibration actuator includes a vibration member constituted by two substantially semi-cylindrical elastic members, a relative moving member disposed on an end face of the vibration member, a first electro-mechanical converting element for generating a torsional vibration about the axis of the vibration member, a second electro-mechanical converting element for generating a longitudinal vibration in the axial direction of the vibration member, a pressing member for making the relative moving member and the vibration member press contact with each other, and a support member the outer circumferential portion of the vibration member to protrude therefrom in the radial direction of the vibration member, and which supports the vibration member.

26 Claims, 12 Drawing Sheets

FIG. 21B PRIOR ART

VIBRATION ACTUATOR

BACKGROUND OF THE INVENTION

1. Field of the Invention

The present invention relates to a vibration actuator for obtaining a driving force by utilizing at least two different types of vibrations.

2. Related Background Art

Figure 17:
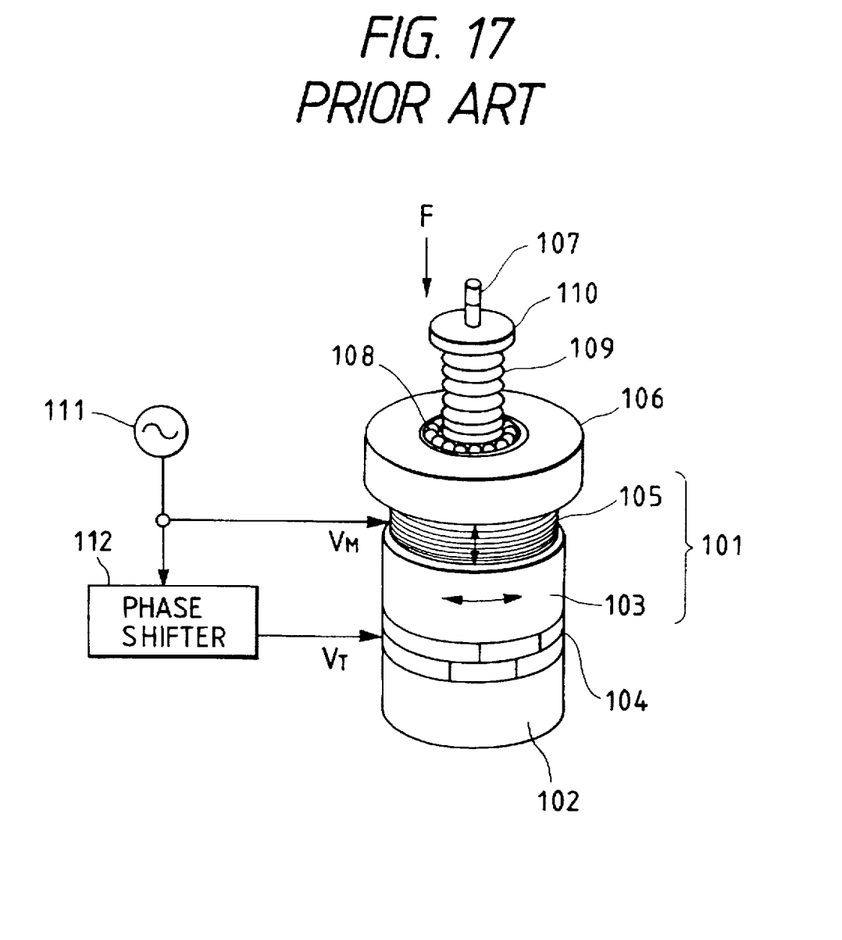
FIG. 17 is a perspective view showing a conventional longitudinal-torsional vibration type vibration actuator.

FIG. 17 is a perspective view showing a conventional vibration actuator utilizing two different types of vibrations, i.e., a longitudinal vibration and a torsional vibration.

Conventionally, in a vibration actuator of this type, a stator 101 is constituted by sandwiching a piezoelectric element 104 for a torsional vibration between two columnar elastic members 102 and 103. A piezoelectric element 105 for a longitudinal vibration is disposed on the elastic member 103. The piezoelectric element 104 for a torsional vibration is polarized in its circumferential direction. On the other hand, the piezoelectric element 105 for a longitudinal vibration is polarized in the direction of its thickness. Furthermore, a rotor 106 is disposed on the piezoelectric element 105 for a longitudinal vibration.

The elastic members 102 and 103 and the piezoelectric elements 104 and 105, which constitute the stator 101, are fixed to a shaft 107 (threadably engage with a screw portion of the shaft 107). The rotor 106 is rotatably arranged on the shaft 107 via a ball bearing 108. The distal end of the shaft 107 threadably engages with a nut 110 via a spring 109 to keep the rotor 106 in press-contact with the stator 101.

The piezoelectric elements 104 and 105 for torsional and longitudinal vibrations are driven by phase-controlling an identical frequency voltage oscillated by an oscillator 111 using a phase shifter 112.

The piezoelectric element 104 for a torsional vibration gives a mechanical displacement for rotating the rotor 106. The piezoelectric element 105 for a longitudinal vibration periodically changes the frictional force acting between the stator 101 and the rotor 106 in synchronism with the period of the torsional vibration generated by the piezoelectric element 104. Thus, the torsional and longitudinal vibrations are synthesized and converted into a motion in one direction.

Figure 18:
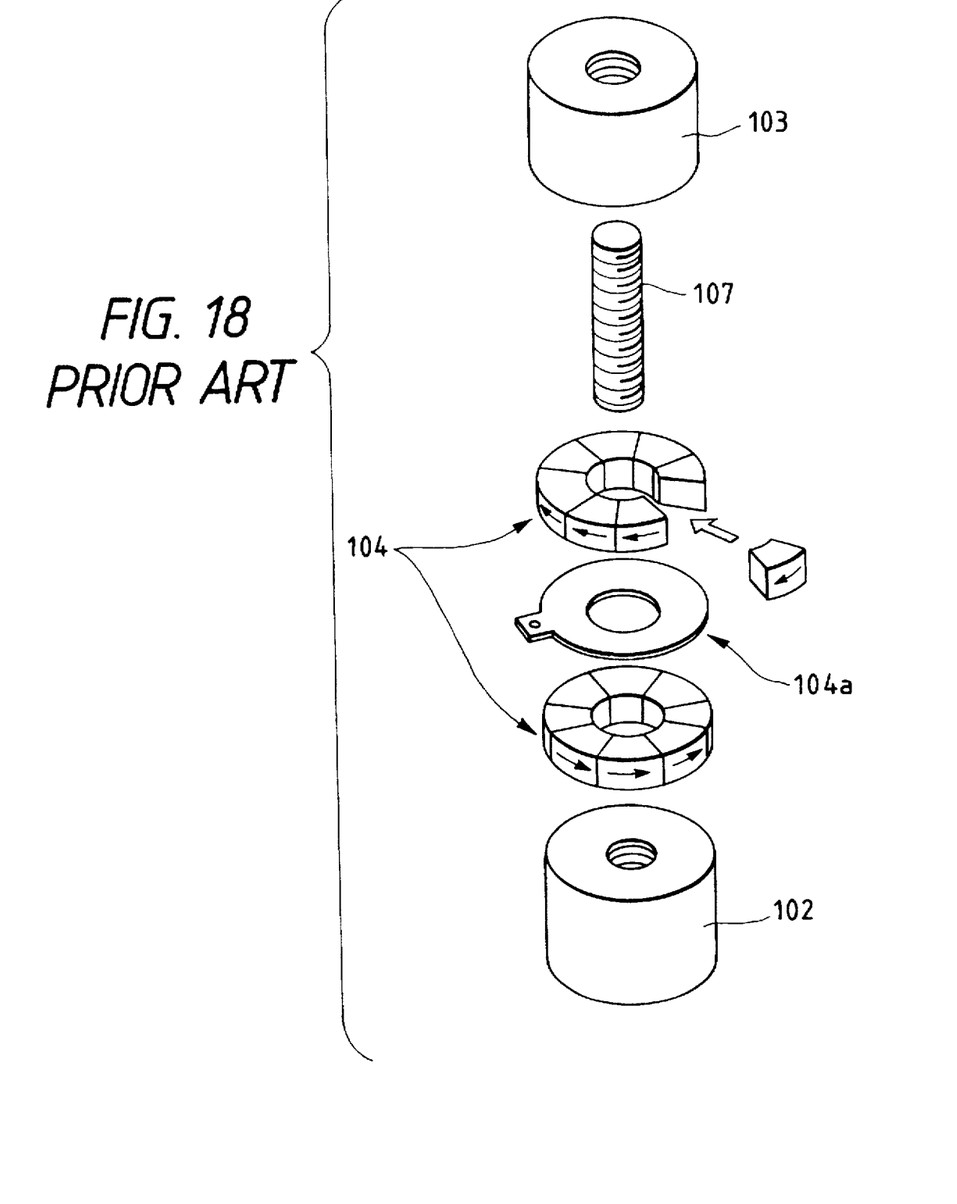
FIG. 18 is an exploded perspective view showing a stator of the conventional vibration actuator.

FIG. 18 is an exploded perspective view of a vibration member of the conventional actuator. The piezoelectric element 104 for a torsional vibration must be polarized in its circumferential direction. To this end, piezoelectric material is temporarily divided into about 6 to 8 fan-shaped small pieces, as shown in FIG. 18. After the small pieces are subjected to polarization processing, they are assembled in a ring shape again. Note that an electrode 104a is inserted between the two layers of the element.

However, in the conventional vibration actuator, when the small pieces of the piezoelectric element for a torsional vibration are assembled in a ring shape, it is difficult to obtain high shape precision for obtaining a precise ring shape.

In view of this problem, a vibration actuator, in which a vibration member is constituted by two rod-shaped members, and a piezoelectric element having a planar shape and sandwiched between these two members, has been proposed.

Figure 19:
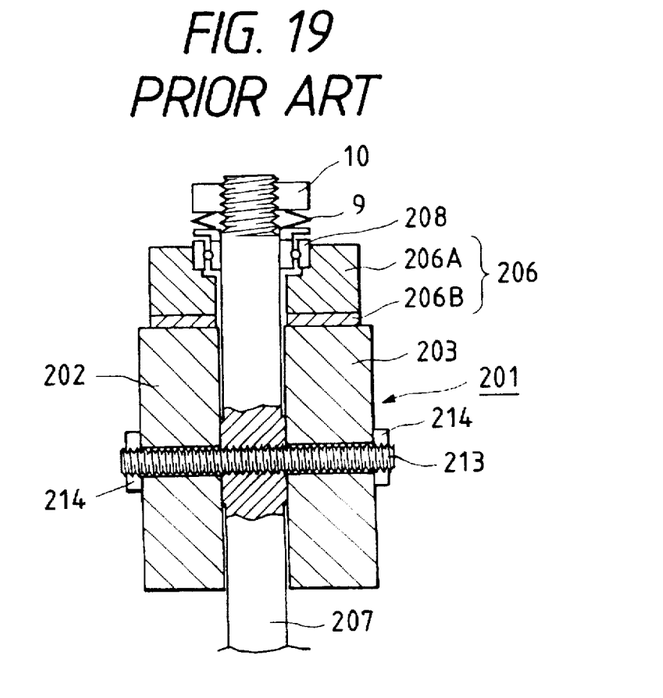
FIG. 19 is a view showing an example of a conventional actuator in which a vibration member is constituted by two rod-shaped members and a piezoelectric element for a torsional vibration having a planar shape and sandwiched between the two members.
Figure 20:
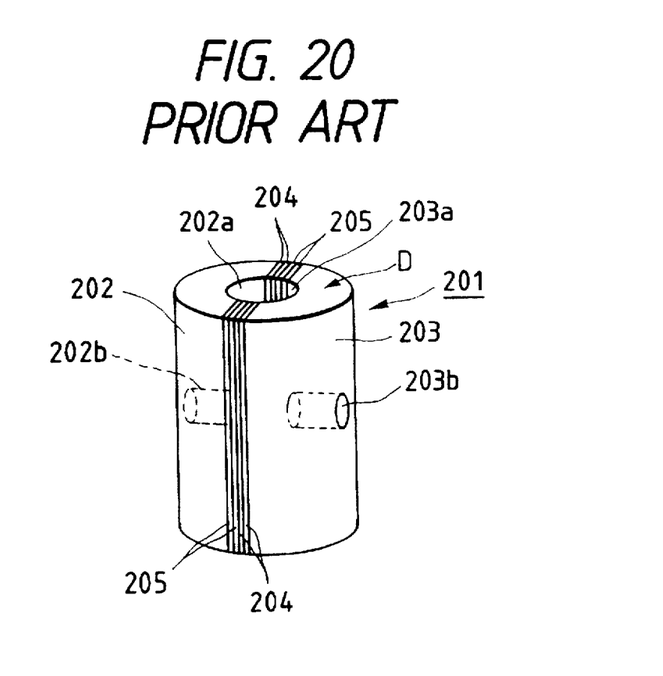
FIG. 20 is a perspective view showing the arrangement of a vibration member of the vibration actuator shown in FIG. 19.
Figure 21A:
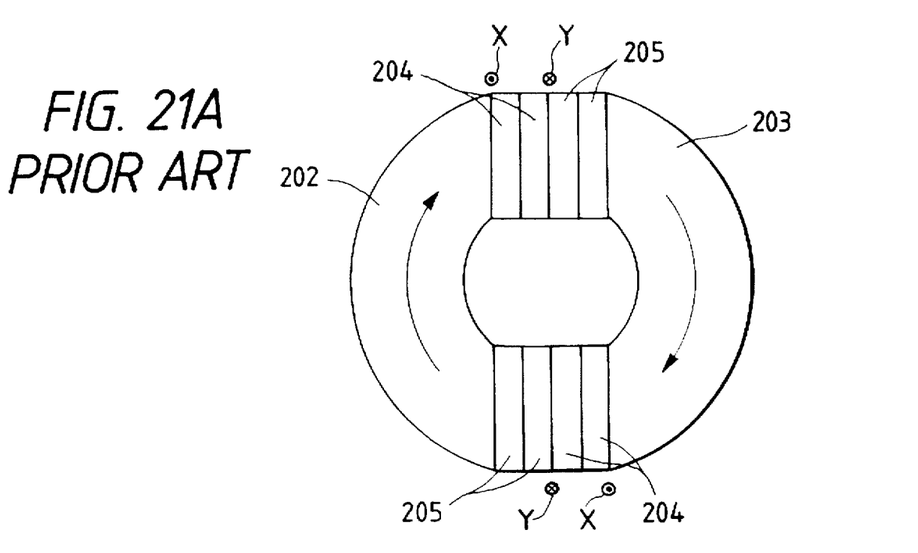
FIGS. 21A and 21B are views for explaining the function of the vibration member of the vibration actuator shown in FIG. 19.
Figure 21B:
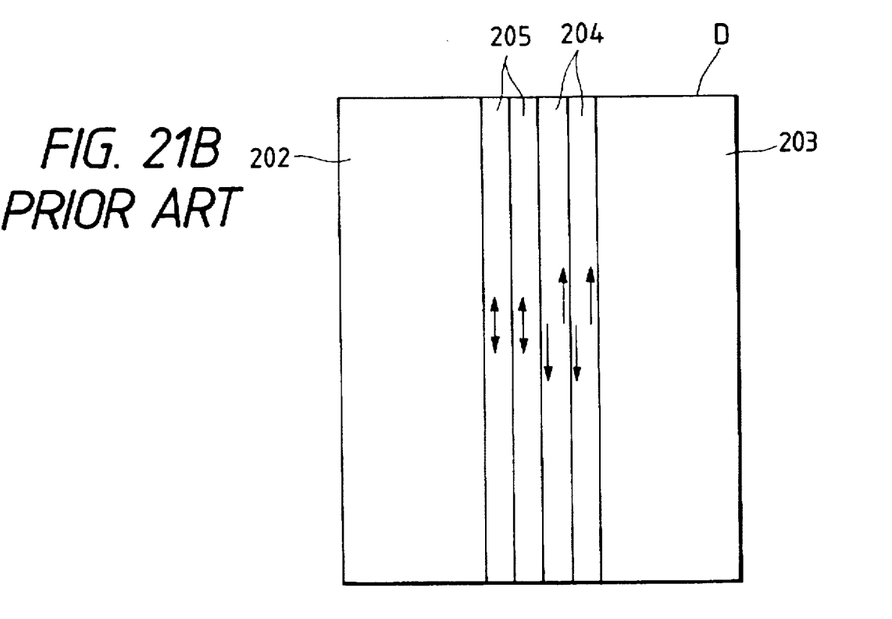

FIG. 19 is a sectional view showing an example of a vibration actuator with the above-mentioned arrangement. FIG. 20 is a perspective view showing the arrangement of a vibration member of the vibration actuator shown in FIG. 19. FIGS. 21A and 21B are views for explaining the function of the vibration member of the vibration actuator shown in FIG. 19. A vibration member 201 is constituted by piezoelectric elements 204 and 205, and elastic members 202 and 203 to which these piezoelectric elements 204 and 205 are joined. The piezoelectric elements 204 and 205 are excited by a driving signal, and convert electrical energy into mechanical energy. The elastic members 202 and 203 generate a driving force on their driving surface D since longitudinal and torsional vibrations are generated upon excitation of the piezoelectric elements 204 and 205.

Each of the elastic members 202 and 203 has a shape obtained by vertically dividing a thick cylinder into two pieces, and the piezoelectric elements 204 and 205 are sandwiched between the divided surfaces. The piezoelectric elements 204 and 205 consist of a total of four layers. Two piezoelectric layers constitute the piezoelectric element 204 for a torsional vibration using a dielectric constant d15. The remaining two piezoelectric layers constitute the piezoelectric element 205 for a longitudinal vibration using a dielectric constant d31.

Through holes 202b and 203b are formed in the elastic members 202 and 203 at substantially the central positions in the direction of their height to extend in a direction substantially parallel to the stacking direction of the piezoelectric elements 204 and 205 (see FIG. 20). The elastic members 202 and 203 are fixed by a bolt 213 and nuts 214 using these holes 202b and 203b to sandwich the piezoelectric elements 204 and 205 therebetween, and to be fixed to a fixing shaft 207 inserted at the center in their axial direction.

A relative moving member 206 is constituted by a base member 206A and a sliding member 206B which contacts the driving surface D of the vibration member 201. The relative moving member 206 is aligned with respect to the fixing shaft 207 by an alignment member 208 such as a bearing fitted in its inner circumferential portion.

The piezoelectric element 204 generates a shear displacement in the longitudinal direction of the elastic members 202 and 203. The layers of the piezoelectric element 204 are disposed so that a direction X pointing out of the page and a direction Y opposite to the direction X of the shear displacement alternate with respect to the circumferential direction in FIG. 21A which is a bottom view of the vibration member 201. More preferably, the maximum shear deformation points in the direction pointing out of the page in FIG. 21A are symmetrical about a given point, and the maximum shear deformation points in the opposite direction in FIG. 21A are symmetrical about a given point. With this layout, the piezoelectric element 204 generates a torsional displacement when its layers undergo shear deformations, thus twisting the bottom surface of the vibration member 201.

The piezoelectric element 205 generates an extensional displacement in the longitudinal direction of the elastic members 202 and 203. The two layers of the piezoelectric element 205 for a longitudinal vibration are disposed to generate a displacement in one direction upon application of a given potential.

With the above-mentioned layout of the piezoelectric element 204 for a torsional vibration using the dielectric constant d15 and the piezoelectric element 205 for a longitudinal vibration using the dielectric constant d31, when a sine wave voltage is input to the piezoelectric element 204 for a torsional vibration, a torsional vibration is generated in the vibration member 201 accordingly. On the other hand, when a sine wave voltage is input to the piezoelectric element 205 for a longitudinal vibration, an extensional motion is generated in the vibration member 201 accordingly.

It is an object of the present invention to provide an optimal support method for a vibration actuator in which a vibration member is constituted by two rod-shaped members and a piezoelectric element for a torsional vibration having a planar shape and sandwiched between the two members.

SUMMARY OF THE INVENTION

In order to achieve the above object, according to an embodiment of the present invention, there is provided a vibration actuator comprising:

- a vibration member constituted by two substantially semi-cylindrical elastic members;
- a relative moving member disposed on an end face of the vibration member;
- a first electro-mechanical converting element for generating a torsional vibration about an axis of the vibration member;
- a second electro-mechanical converting element for generating a longitudinal vibration in an axial direction of the vibration member;
- a pressing member for making the relative moving member and the vibration member press contact with each other; and
- a support member on an outer circumferential portion of the vibration member to protrude therefrom in a radial direction of the vibration member, and which supports the vibration member.

In this case, the support member can be formed integrally with the elastic members constituting the vibration member.

Also, the support member can be arranged at a node position of the torsional vibration generated in the vibration member.

The first electro-mechanical converting element can be disposed between the elastic members of the vibration member.

Furthermore, a housing to which the support member is fixed can be disposed outside the vibration member.

Moreover, the second electro-mechanical converting element is disposed between the elastic members of the vibration member.

The support member can comprise a ring-shaped or divided ring-shaped projections formed on the vibration member.

The support member can support the vibration member on at least three support points.

According to another embodiment, there is provided a vibration actuator comprising:

- a vibration member constituted by two substantially semi-cylindrical elastic members;
- a relative moving member disposed on an end face of the vibration member;
- a first electro-mechanical converting element for generating a torsional vibration about an axis of the vibration member;
- a second electro-mechanical converting element for generating a longitudinal vibration in an axial direction of the vibration member;
- a pressing member for making the relative moving member and the vibration member press contact with each other; and
- a support member on an inner circumferential portion of the vibration member to protrude therefrom in a radial direction of the vibration member, and which supports the vibration member.

In this case, the support member can be formed integrally with the elastic members constituting the vibration member.

Also, the support member can be arranged at a node position of the torsional vibration generated in the vibration member.

Furthermore, the first electromechanical converting element can be disposed between the elastic members of the vibration member.

Moreover, the second electro-mechanical converting element can be disposed between the elastic members of the vibration member.

DESCRIPTION OF THE PREFERRED EMBODIMENTS

The preferred embodiments of the present invention will be described in more detail below with reference to the accompanying drawings.

Figure 1:
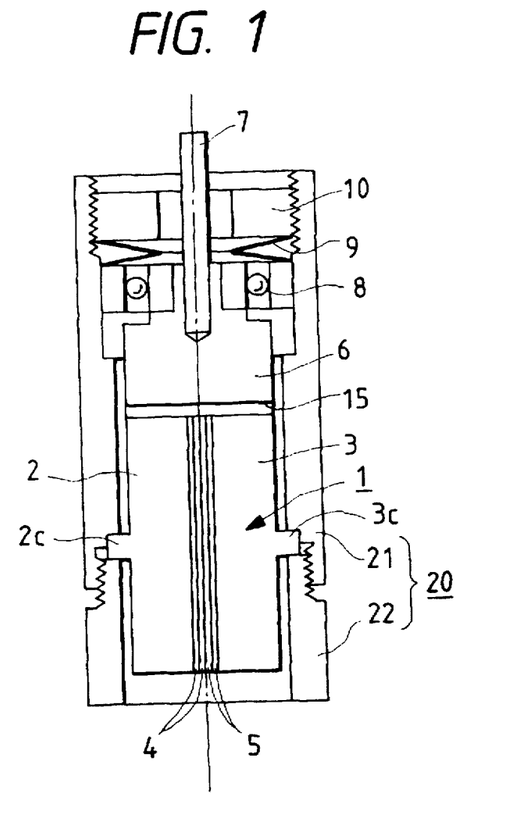
FIG. 1 is a sectional view showing the first embodiment of a vibration actuator according to the present invention.
Figure 2A:
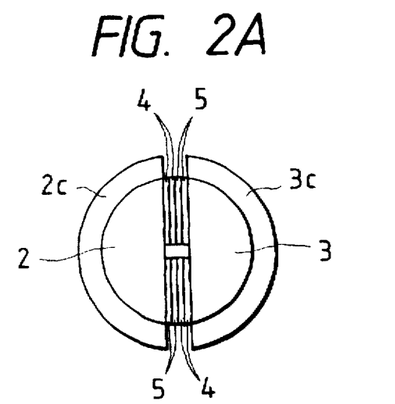
FIGS. 2A and 2B are respectively a plan view and a perspective view showing a stator of the vibration actuator shown in FIG. 1.
Figure 2B:
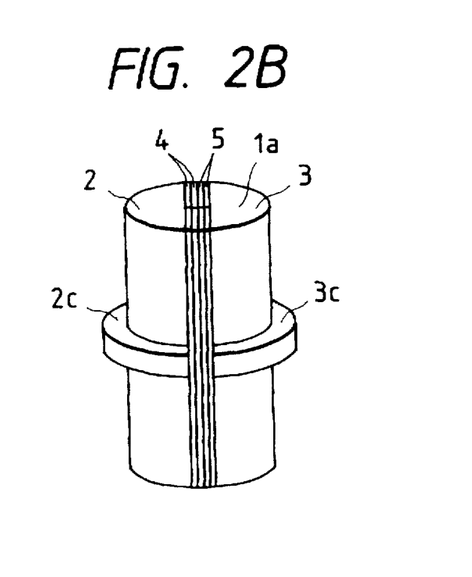

FIG. 1 is a sectional view showing the first embodiment of a vibration actuator according to the present invention. FIGS. 2A and 2B are respectively a plan view and a perspective view showing a stator of the vibration actuator shown in FIG. 1.

A stator 1 of the vibration actuator is constituted by substantially semi-cylindrical elastic members 2 and 3, and four planar piezoelectric elements 4 and 5 (the layout of the piezoelectric elements 4 and 5 will be described later with reference to FIG. 3) sandwiched between these elastic members 2 and 3. The elastic members 2 and 3 and the piezoelectric elements 4 and 5 are fixed by adhesion. Note that these members may be fixed using a bolt and nuts, as shown in FIG. 19, in addition to adhesion. Flange-shaped projections 2c and 3c are integrally formed on the outer circumferential surfaces of the elastic members 2 and 3 at predetermined positions (substantially the central portions) in their output shaft direction. The projections 2c and 3c support the stator 1 as they are vertically clamped by other members. In this embodiment, the projections 2c and 3c are clamped by a housing 20. The housing 20 is constituted two, i.e., upper and lower, cylinder members 21 and 22. The cylinder members 21 and 22 are formed with screw portions at their joint portions. When the cylinder members 21 and 22 house the stator 1 therein and the screw portions are fastened, the cylinder members 21 and 22 can fix the projections 2c and 3c by clamping them therebetween. Since the projections 2c and 3c and the elastic members 2 and 3 can be simultaneously worked, working is easy. Furthermore, since the parallel precision between the surfaces of the projections 2c and 3c and the sliding surface can be improved, an offset contact state between the stator and the rotor can be prevented, thus improving the driving performance of the vibration actuator.

A rotor 6 is rotatably supported. An output shaft 7 is arranged at the center of rotation of the rotor 6. The rotor 6 is disposed to contact a driving surface 1a of the stator 1 via a sliding member 15. The rotor 6 is rotatably supported by the cylinder member 21 via a ball bearing 8. The ball bearing 8 is inserted to be movable in the axial direction of the cylinder member 21. The ball bearing 8 is pressed in the direction of the stator 1 by a Belleville spring pressing member 10 via a Belleville spring 9. The Belleville spring pressing member 10 is fixed by a screw to a screw portion, on the opening side, of the cylinder member 21, and its pressing force can be adjusted when the member 10 is rotated.

Note that the projections 2c and 3c may have a spring function with respect to a motion in the axial direction by decreasing their thicknesses. With this structure, even when the sliding surface of the rotor 6 is inclined, the projections 2c and 3c deform to allow the sliding surfaces of the stator 1 and the rotor 6 to be in tight contact with each other. Also, a decrease in output, a decrease in efficiency, an increase in wear, and the like of the vibration actuator, that occur in a non-uniform contact state, i.e., in an offset contact state, can be prevented. Note that the projections 2c and 3c may be constituted by three or more projections.

Figure 3:
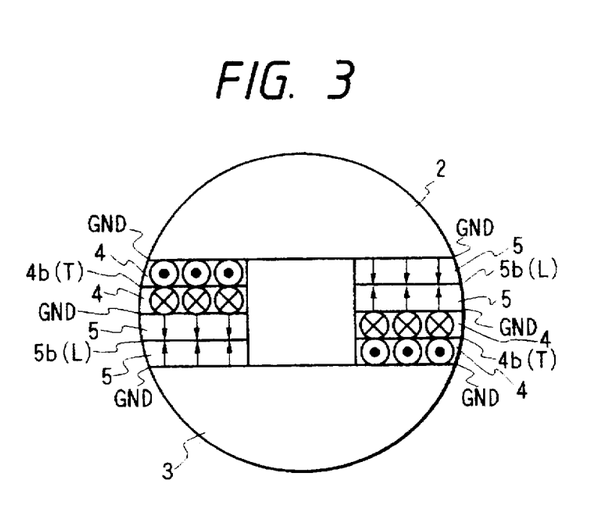
FIG. 3 is a view showing the layout of piezoelectric elements of the vibration actuator according to the first embodiment.

FIG. 3 is a view showing the layout of the piezoelectric elements of the vibration actuator according to the first embodiment. FIGS. 5A and 5B and FIGS. 6A and 6B are views showing the polarization direction and electrode layout of the piezoelectric elements used in the vibration actuator of the first embodiment, and deformations of the piezoelectric elements upon application of a voltage.

The piezoelectric elements 4 are elements for generating a torsional vibration. The piezoelectric elements 5 are elements for generating a longitudinal vibration. Two piezoelectric elements 4 are arranged at the upper left position when viewed from the center of the vibration member 1 in FIG. 3, and two piezoelectric elements 4 are arranged at the lower right position in FIG. 3. On the other hand, two piezoelectric elements 5 are arranged at the upper right position when viewed from the center of the vibration member 1 in FIG. 3, and two piezoelectric elements 5 are arranged at the lower left position in FIG. 3.

An electrode 4b is inserted between each two piezoelectric elements 4. On the other hand, an electrode 5b is inserted between each two piezoelectric elements 5. The electrodes 4b and 5b consist of a metal foil of, e.g., phosphor bronze. Portions between the piezoelectric elements 4 and 5, and the elastic members 2 and 3 are grounded. Also, portions between the piezoelectric elements 4 and 5 are grounded via ground electrodes.

Figure 5A:
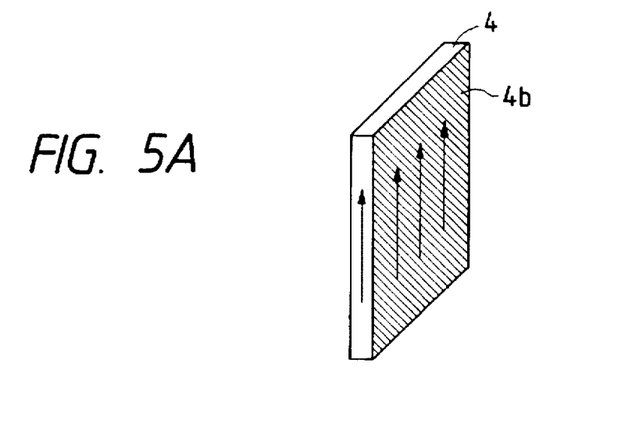
FIGS. 5A and 5B are views showing the polarization direction and electrode layout of a piezoelectric element used in the vibration actuator according to the first embodiment, and the deformation of the piezoelectric element upon application of a voltage.
Figure 5B:
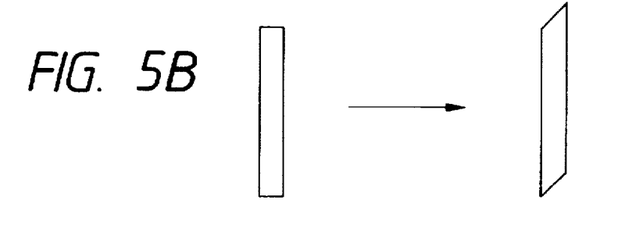
Figure 6A:
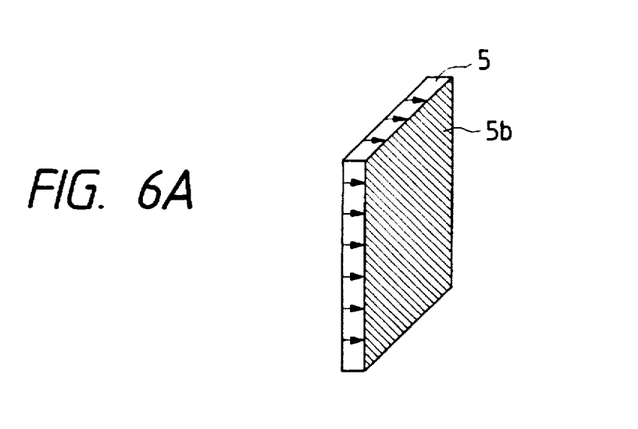
FIG. 6A and 6B are views showing the polarization direction and electrode layout of a piezoelectric element used in the vibration actuator according to the first embodiment, and the deformation of the piezoelectric element upon application of a voltage.
Figure 6B:
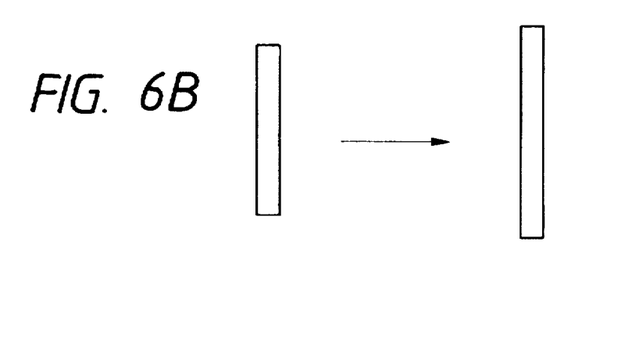

FIG. 3 shows the polarization directions of the piezoelectric elements 4 for a torsional vibration and the piezoelectric elements 5 for a longitudinal vibration. Each piezoelectric element 4 for a torsional vibration is polarized in the direction of the output shaft. Each piezoelectric element 5 for a longitudinal vibration is polarized in the direction of its thickness (in a direction substantially perpendicular to the output shaft). More specifically, each piezoelectric element 4 for a torsional vibration is polarized in the longitudinal direction of the flat plate, as shown in FIG. 5A. For this reason, when a voltage is applied to this element using the electrode shown in FIG. 5A, a shear deformation is generated, as shown in FIG. 5B. By utilizing this shear deformation, a torsional vibration can be generated in the stator 1 (elastic members 2 and 3). On the other hand, each piezoelectric element 5 for a longitudinal vibration is polarized in the direction of thickness of the flat plate, as shown in FIG. 6A. For this reason, when a voltage is applied to this element using the electrode shown in FIG. 6A, an extensional deformation is generated, as shown in FIG. 6B. By utilizing the extensional deformation of the piezoelectric element 5, a longitudinal vibration can be generated in the stator 1 (elastic members 2 and 3).

Figure 7:
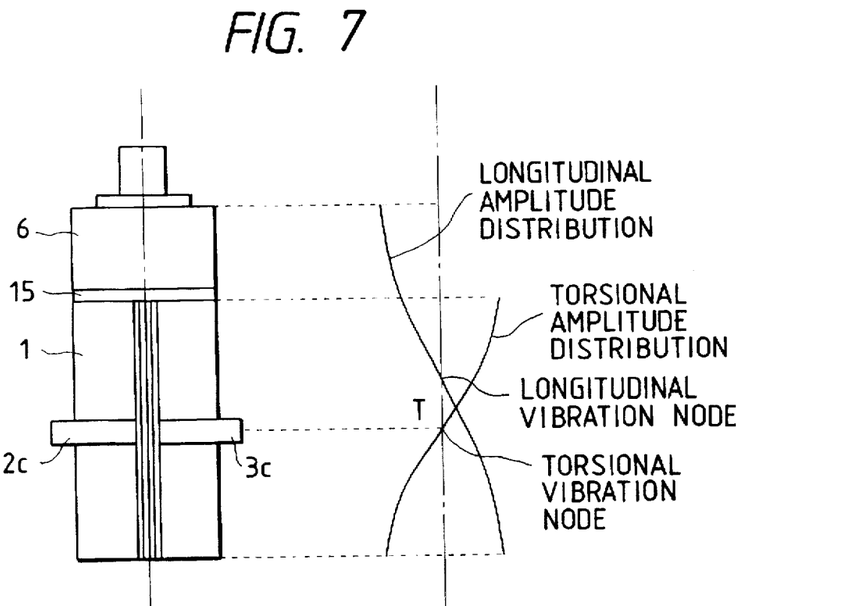
FIG. 7 is a view showing the vibration modes generated in the stator of the vibration actuator.

FIG. 7 shows the vibration modes generated in the stator of the vibration actuator of this embodiment. The vibration actuator of this embodiment obtains a driving force by utilizing a first longitudinal vibration and a first torsional vibration. As shown in FIG. 7, the amplitude distribution of the longitudinal vibration is expressed as a vibration including the stator 1 and the rotor 6. On the other hand, the amplitude distribution of the torsional vibration is expressed as a vibration of only the stator 1. In this embodiment, roughly the central portion of the stator 1 corresponds to the position of a node T of the torsional vibration. The projections 2c and 3c are arranged at the positions of the node T of the torsional vibration. The projections 2c and 3c are formed to have a flange shape. The flange shape deforms easier in the direction of the longitudinal vibration than in the torsional direction of the torsional vibration. For this reason, when the projections 2c and 3c are supported, restraint on the longitudinal vibration generated in the stator 1 is small. As for the torsional vibration, since the positions of the node T of the torsional vibration are supported, restraint on the torsional vibration is also small. Therefore, when the projections 2c and 3c are arranged and supported at the positions of the node of the torsional vibration, longitudinal and torsional vibrations both of large amplitudes can be obtained. For this reason, the performance of the vibration actuator can be improved.

Figure 4:
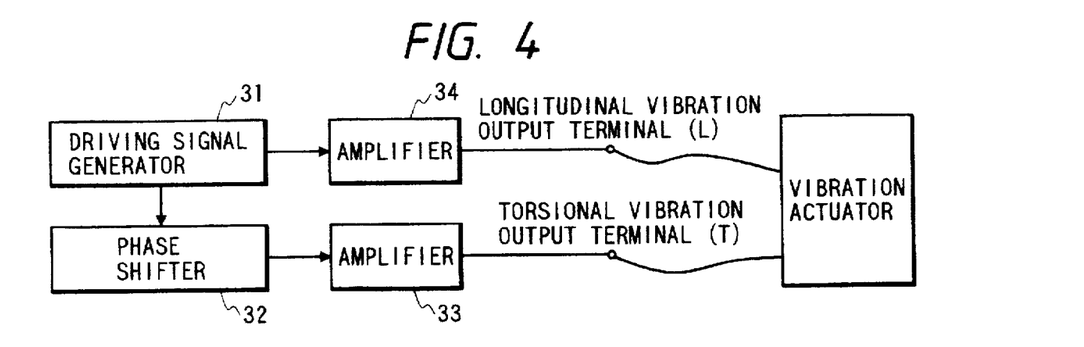
FIG. 4 is a block diagram showing a driving circuit of the vibration actuator according to the first embodiment.

FIG. 4 is a block diagram showing the driving circuit of the vibration actuator of the first embodiment. A driving signal generator 31 generates a driving signal of a predetermined frequency. The output from the driving signal generator 31 is divided into two outputs. One output is connected to an amplifier 33 via a phase shifter 32 for advancing (or delaying) the phase by 90°. The other output is connected to an amplifier 34.

The amplifier 33 is connected to the electrodes 4b of the vibration actuator via a torsional vibration output terminal (T). The amplifier 34 is connected to the electrodes 5b of the vibration actuator via a longitudinal vibration output terminal (L).

When the phase difference defined by the phase shifter 23 is adjusted to select an optimal value, the torque, rotational speed, and efficiency of the vibration actuator can be improved.

When the piezoelectric elements 4 for a torsional vibration generate a rotational displacement in the positive direction, the piezoelectric elements 5 for a longitudinal vibration generate a displacement in the positive direction (in the contacting direction of the stator 1 and the rotor 6). For this reason, the torsional vibration in the stator 1 is transmitted to the rotor 6, and the rotor 6 rotates in the positive direction. On the other hand, when the piezoelectric elements 4 for a torsional vibration generate a rotational displacement in the negative direction, the piezoelectric elements 5 for a longitudinal vibration generate a displacement in the negative direction (in the separating direction of the stator 1 and the rotor 6). For this reason, the torsional vibration in the stator 1 is not transmitted to the rotor 6, and the rotor 6 does not rotate. By repeating this operation, the rotor 6 rotates in one direction.

In order to rotate the rotor 6 in the reverse direction, the phase difference of the phase shifter 32 can be changed from 90° to −90°. Upon this change, the direction of the torsional vibration transmitted to the rotor 6 is reversed, thus rotating the rotor 6 in the reverse direction.

In order to efficiently drive the vibration actuator of this embodiment, it is preferable to roughly match the resonance frequency of the torsional vibration with that of the longitudinal vibration, and to drive the vibration actuator at a frequency near the resonance frequency, thereby simultaneously increasing the rotational displacement amplitude and the longitudinal vibration amplitude. In this case, in order to roughly match the resonance frequencies of the two vibrations, an optimal condition can be obtained by changing the material and shape of the stator 1, the material and shape of the rotor 6, and the material, shape, pressing force, and the like of the sliding member 15.

Figure 8:
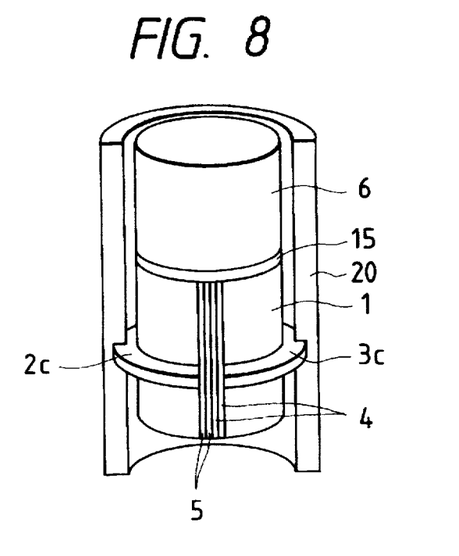
FIG. 8 is a perspective view showing a modification of the vibration actuator according to the first embodiment.

FIG. 8 is a perspective view showing a modification of the vibration actuator according to the first embodiment. As shown in FIG. 8, the housing 20 can also be constituted by two members which are divided in the axial direction of the rotation shaft (note that FIG. 8 does not illustrate the ball bearing, Belleville spring, Belleville spring pressing member, and the like).

The first embodiment can provide the following advantages since it has the above-mentioned arrangement. Since the stator 1 is supported by the external housing 20 via the projections 2c and 3c, it can have a compact structure. Since the stator 1 has no shaft at its central portion, the piezoelectric elements 4 and 5 in the stator 1 can have a large size. For this reason, a compact vibration actuator with a large torque and a high rotational speed can be realized.

Figure 9:
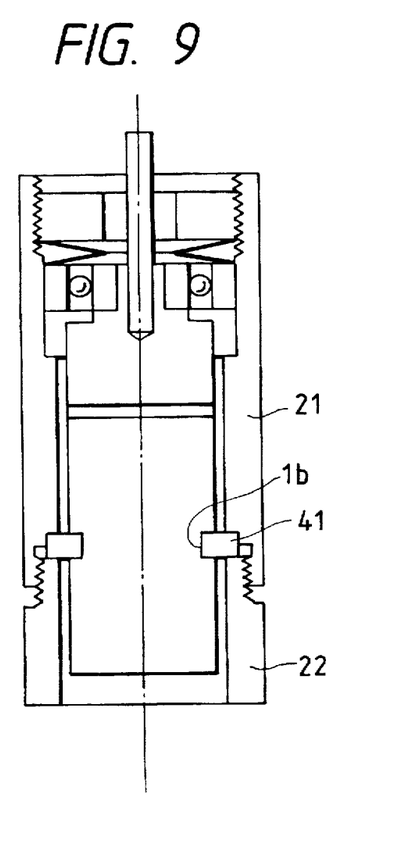
FIG. 9 is a sectional view showing the second embodiment of a vibration actuator according to the present invention.
Figure 10A:
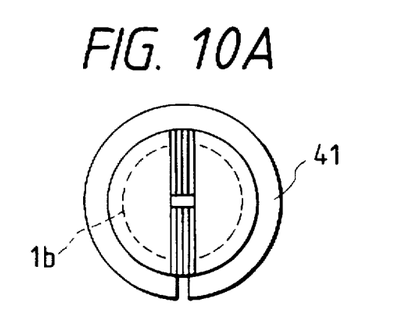
FIGS. 10A to 10C are views showing a stator of a vibration actuator according to the second embodiment of the present invention.
Figure 10B:
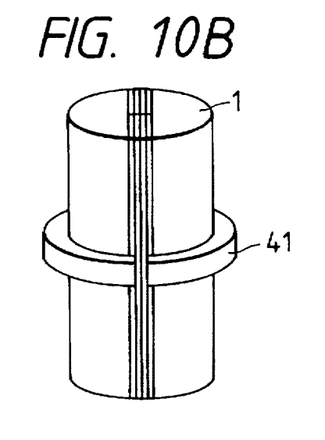
Figure 10C:
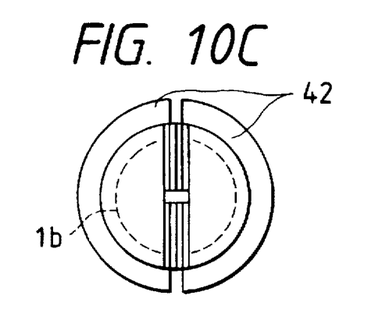

FIG. 9 is a sectional view showing the second embodiment of a vibration actuator according to the present invention. FIGS. 10A to 10C are views showing a stator of the vibration actuator of the second embodiment. Note that the same reference numerals in embodiments to be described below denote portions having the same functions as those in the first embodiment described above, and a repetitive description thereof will be avoided.

The vibration actuator of the second embodiment supports the stator 1 using a notched ring [FIGS. 10A and 10B] 41 or divided rings 42 [FIG. 10C] as a member separated from the stator 1.

The stator 1 has a groove portion 1b at its central portion, and the notched ring 41 or the divided rings 42 are attached to the groove portion 1b.

In the second embodiment, in order to obtain required driving characteristics, only the support member can be replaced without replacing the stator 1, and easy working is assured.

Figure 11:
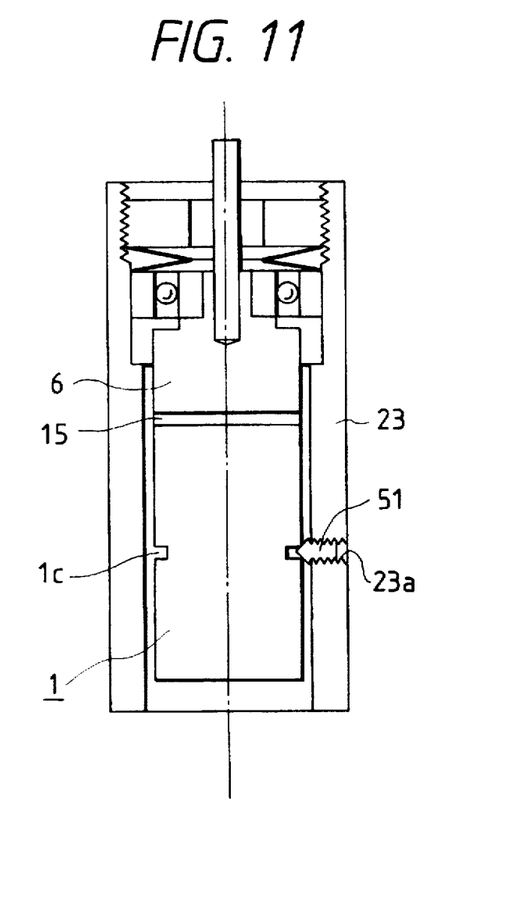
FIG. 11 is a sectional view showing the third embodiment of a vibration actuator according to the present invention.
Figure 12A:
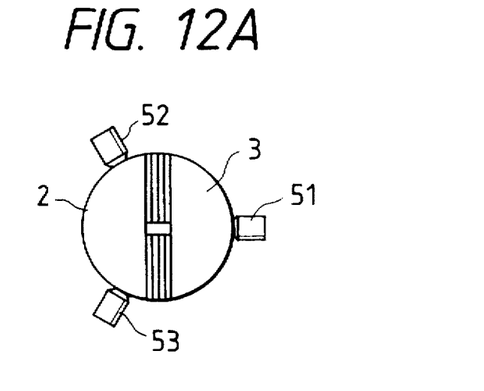
FIGS. 12A and 12B are views showing a stator of the vibration actuator according to the third embodiment.
Figure 12B:
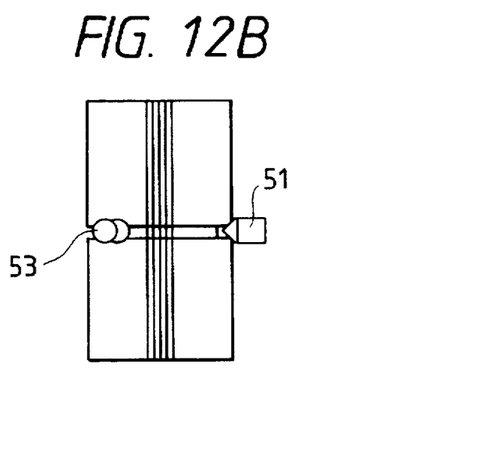

FIG. 11 is a sectional view showing the third embodiment of a vibration actuator according to the present invention. FIGS. 12A and 12B are views showing a stator of the vibration actuator according to the third embodiment.

In the vibration actuator of the third embodiment, a groove portion 1c is formed at the central portion of the stator 1. Screw holes 23a are formed on the cylinder member 23 at positions corresponding to the groove portion 1c. Set screws 51, 52, and 53 are threadably fixed to the screw holes 23a of the cylinder member 23. The distal ends of the set screws 51, 52, and 53 engage with the groove portion 1c of the stator 1, thereby supporting the stator 1.

The set screw 51 is disposed in a direction perpendicular to the piezoelectric elements 4 and 5 of the elastic member 3. The set screws 52 and 53 are disposed at positions angularly separated by 120° from the position of the set screw 51. For this reason, high supporting stability is assured. Since the stator 1 is supported at only three points, restraint on the stator 1 is small, and the vibration loss is small.

Note that pins or the like may be used in place of the set screws 51 to 53.

The third embodiment allows easy working since it has a simple structure.

Figure 13A:
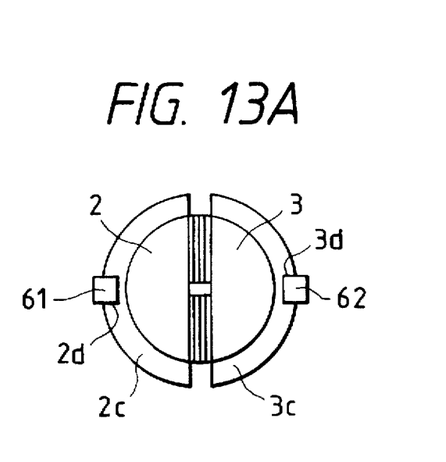
FIGS. 13A and 13B are respectively a plan view and a perspective view showing the fourth embodiment of a vibration actuator according to the present invention.
Figure 13B:
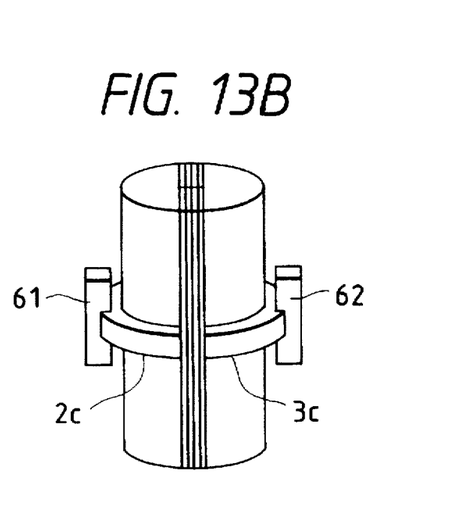

FIGS. 13A and 13B are respectively a plan view and a perspective view showing the fourth embodiment of a vibration actuator according to the present invention.

In the vibration actuator of the fourth embodiment, key grooves 2d and 3d are respectively formed on the projections 2c and 3c of the elastic members 2 and 3. Keys 61 and 62 are fitted in these key grooves to prevent rotation of the stator 1. Note that the key grooves are also formed on the inner surfaces of the cylinder members (not shown) as in the projections 2c and 3c.

In the fourth embodiment, even when a rotation load is generated in the rotor 6, the stator 1 can be prevented from being rotated. Since the projections 2c and 3c need not be fixed by being clamped by the two cylinder members 21 and 22, as shown in FIG. 1, the fastening force may be decreased, or the stator 1 may be fixed by supporting it only at the lower side (cylinder member 22). As a result, the stator 1 can be supported without restraining its vibration.

Figures 14A, 14B:
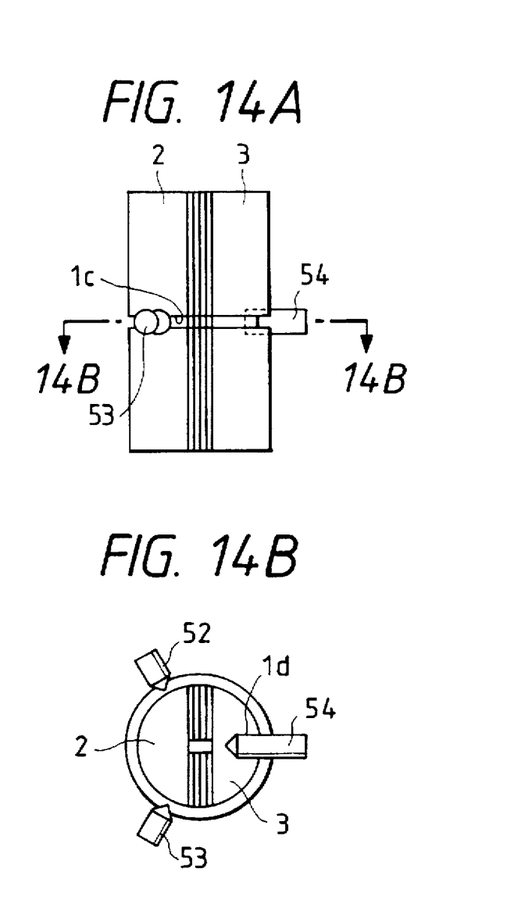
FIG. 14A is a front view showing the fifth embodiment of a vibration actuator according to the present invention.
FIG. 14B is a sectional view taken along a line 14B–14B in FIG. 14A.

FIG. 14A is a front view showing the fifth embodiment of a vibration actuator according to the present invention, and FIG. 14B is a sectional view taken along a line 14B–14B in FIG. 14A.

In the vibration actuator of the fifth embodiment, a groove 1c and a hole 1d are formed on the side surface of the stator 1 (elastic member 3). Pin screws (or pins) 52 and 53 engage with the groove 1c, and a pin screw (or a pin) 54 is inserted in the hole 1d. With this structure, the stator 1 is supported, and rotation of the stator 1 is also prevented. The fifth embodiment has advantages of both the third and fourth embodiments.

Figure 15:
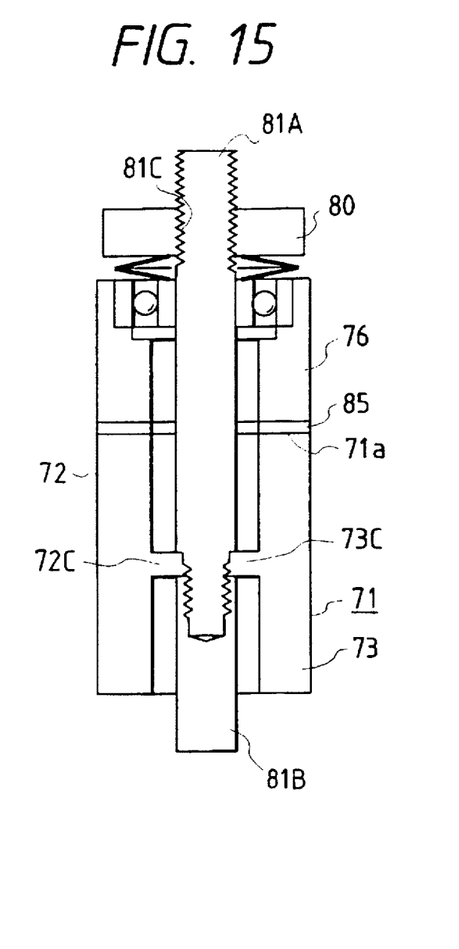
FIG. 15 is a sectional view showing the sixth embodiment of a vibration actuator according to the present invention.
Figure 16A:
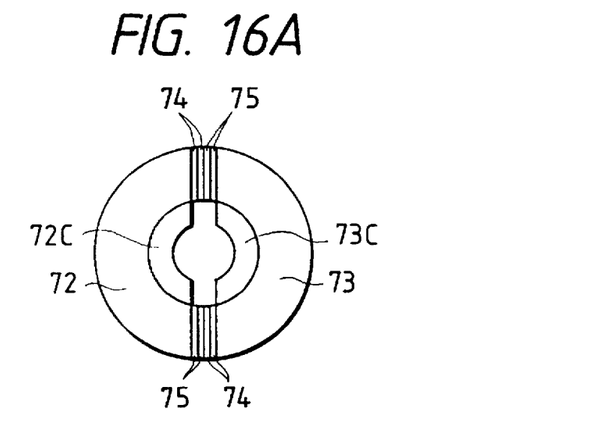
FIGS. 16A and 16B are respectively a plan view and a perspective view showing a stator of the vibration actuator shown in FIG. 15.
Figure 16B:
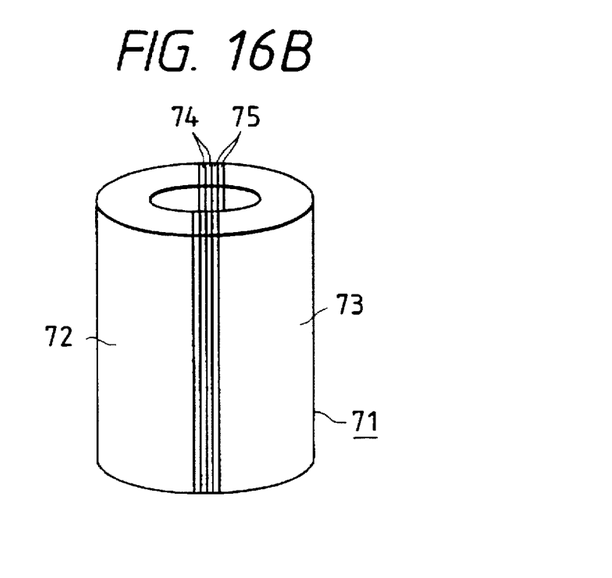

FIG. 15 is a sectional view showing the sixth embodiment of a vibration actuator according to the present invention. FIGS. 16A and 16B are respectively a plan view and a perspective view showing a stator of the vibration actuator shown in FIG. 15.

A stator 71 of the vibration actuator of this embodiment is constituted by four planar piezoelectric elements 74 and 75, and elastic members 72 and 73 which are joined to sandwich the piezoelectric elements 74 and 75 therebetween. Each of the elastic members 72 and 73 has a shape obtained by vertically dividing a thick cylinder, and the piezoelectric elements 74 and 75 are sandwiched between the divided surfaces of these elastic members. The elastic members 72 and 73 and the piezoelectric elements 74 and 75 are fixed by adhesion. Note that these members may be fixed using a bolt and nuts, as shown in FIG. 19, in addition to adhesion. Flange-shaped projections 72c and 73c are integrally formed at predetermined positions, in the output shaft direction, on the inner circumferential surfaces of the elastic members 72 and 73. A fixing shaft 81 is inserted in a central space of the stator 71. The fixing shaft 81 is disposed not to contact the inner circumferential surfaces of the elastic members 72 and 73, and the piezoelectric elements 74 and 75. The fixing shaft 81 is divided into upper and lower fixing shafts 81A and 81B. The divided portion of the upper fixing shaft 81A has a small diameter so that the divided portion is inserted in a circular space defined by the projections 72c and 73c. A male screw is formed on the distal end portion of the upper fixing shaft 81A. On the other hand, a female screw is formed on the divided surface of the lower fixing shaft 81B. The stator 71 is fixed to the fixing shaft 81 in such a manner that the elastic members 72 and 73, and the piezoelectric elements 74 and 75 are fixed, and thereafter, the upper and lower fixing shafts 81A and 81B threadably engage with each other while vertically sandwiching the projections 72c and 73c therebetween. The projections 72c and 73c are formed at positions corresponding to the node of a torsional vibration as in the first embodiment.

A rotor 76 is formed into a ring shape, and the fixing shaft 81 is inserted therein. The rotor 76 is disposed to contact a driving surface 71a of the stator 71 via a sliding member 85.

A ball bearing 88 is set in the rotor 76, and the rotor 76 is rotatably supported. The ball bearing 88 is pressed in the direction of the stator 71 by a Belleville spring pressing member 80 via a Belleville spring 79. The Belleville spring pressing member 80 is fixed by a screw to a screw portion 81C formed on the upper fixing shaft, and can adjust the pressing force when it is rotated.

In the sixth embodiment as well, the driving circuit and the driving principle are the same as those in the first to fifth embodiments, and a detailed description thereof will be omitted.

In this embodiment, the outer diameter of the vibration actuator can be reduced. In addition, since the stator is supported using a fixing shaft, the vibration actuator is easy to attach.

The present invention is not limited to the above-mentioned embodiments, and various changes and modifications may be made within the scope of the invention. Such changes and modifications are incorporated in the present invention. For example, piezoelectric elements have been exemplified as electro-mechanical converting elements. Alternatively, electrostrictive elements or magnetostrictive elements may be used. In each of the above embodiments, the piezoelectric elements 4 and 5 for torsional and longitudinal vibrations are sandwiched between the elastic members 2 and 3. Alternatively, the piezoelectric elements 5 for a longitudinal vibration may be disposed on chamfered portions formed in the axis direction on the outer circumferential surfaces of the elastic members 2 and 3.

What is claimed is:

1. A vibration actuator comprising:

a vibration member including two substantially semi-cylindrical elastic members;

a relative moving member disposed on an end face of said vibration member;

a first electro-mechanical converting element for generating a torsional vibration about an axis of said vibration member;

a second electro-mechanical converting element for generating a longitudinal vibration in an axial direction of said vibration member;

a pressing member for pressing said relative moving member and said vibration member against each other; and a support portion which is disposed on an outer circumferential portion of said vibration member to protrude therefrom in a radial direction of said vibration member; and a housing disposed outside said vibration member, said support portion cooperating with said housing to support said vibration member.

2. A vibration actuator according to claim 1, wherein said support portion is formed integrally with the said elastic members.

3. A vibration actuator according to claim 1, wherein said support portion is disposed at a node position of the torsional vibration generated in said vibration member.

4. A vibration actuator according to claim 1, wherein said first electro-mechanical converting element is disposed between the elastic members of said vibration member.

5. A vibration actuator according to claim 1, wherein said second electro-mechanical converting element is disposed between the elastic members of said vibration member.

6. A vibration actuator according to claim 1, wherein said support portion comprises a substantially ring-shaped projection or partial ring-shaped projections formed on said vibration member.

7. A vibration actuator according to claim 1, wherein said support portion supports said vibration member on at least three support points.

8. A vibration actuator comprising:

a vibration member including two substantially semi-cylindrical elastic members;

a relative moving member disposed on an end face of said vibration member;

a first electro-mechanical converting element for generating a torsional vibration about an axis of said vibration member;

a second electro-mechanical converting element for generating a longitudinal vibration in an axial direction of said vibration member;

a pressing member for pressing said relative moving member and said vibration member against each other; and a support portion which is formed integrally on an inner circumferential portion of said vibration member to protrude therefrom in a radial direction of said vibration member and to support said vibration member.

9. A vibration actuator according to claim 8, wherein said support portion is formed integrally with said elastic members.

10. A vibration actuator according to claim 8, wherein said support portion is arranged at a node position of the torsional vibration generated in said vibration member.

11. A vibration actuator according to claim 8, wherein said first electro-mechanical converting element is disposed between the elastic members of said vibration member.

12. A vibration actuator according to claim 8, wherein said second electro-mechanical converting element is disposed between the elastic members of said vibration member.

13. A vibration actuator comprising:

a vibration member including two substantially semi-cylindrical elastic members;

a relative moving member disposed on an end face of said vibration member;

a first electro-mechanical converting element for generating a torsional vibration about an axis of said vibration member;

a second electro-mechanical converting element for generating a longitudinal vibration in an axial direction of said vibration member;

a pressing member for pressing said relative moving member and said vibration member against each other; and a support portion formed integrally on a circumferential portion of said vibration member, and protruding in a radial direction of said vibration member to support said vibration member.

14. A vibration actuator comprising:

a vibration member including two substantially semi cylindrical elastic members;

a relative moving member disposed on an end face of said vibration member;

a first electro-mechanical converting element for generating a torsional vibration about an axis of said vibration member;

a second electro-mechanical converting element for generating a longitudinal vibration in an axial direction of said vibration member;

a pressing member for pressing said relative moving member and said vibration member against each other; and a support member which engages an indented portion of said vibration member to support said vibration member.

15. A vibration actuator comprising:

a vibration member including two substantially semi-cylindrical elastic members;

a relative moving member disposed on an end face of said vibration member;

a first electro-mechanical converting element for generating a torsional vibration about an axis of said vibration member;

a second electro-mechanical converting element for generating a longitudinal vibration in an axial direction of said vibration member;

a pressing member for pressing said relative moving member and said vibration member against each other; and a substantially ring-shaped support member or a plurality of partially ring-shaped support members disposed on a circumferential portion of said vibration member, and protruding in a radial direction of said vibration member to support said vibration member.

16. A vibration actuator according to claim 13, wherein said support portion is constructed to cooperate with a key member extending in said axial direction of said vibration member.

17. A vibration actuator according to claim 16, wherein said support portion has a groove portion for receiving said key member.

18. A vibration actuator according to claim 13, wherein said vibration member is substantially cylindrical and said support portion is constructed to cooperate with two key members at positions diametrically opposed across said vibration member.

19. A vibration actuator according to claim 18, wherein said support portion has groove portions for receiving said key members.

20. A vibration actuator according to claim 13, wherein said support portion includes two support members formed, respectively, on said two elastic members.

21. A vibration actuator according to claim 14, wherein a substantially ring-shaped support member or a plurality of partially ring-shaped support members engage said indented portion.

22. A vibration actuator according to claim 14, wherein said support member is a screw.

23. A vibration actuator according to claim 14, wherein said support member is a pin.

24. A vibration actuator according to claim 14, wherein a plurality of said support members engage indented portions of said vibration member.

25. A vibration actuator according to claim 24, wherein said vibration member is substantially cylindrical and three support members are arranged at substantially equal angles circumferentially of said vibration member.

26. A vibration actuator according to claim 24, wherein one of said support members includes a pin to prevent rotation of said vibration member.

* * * * *